May 22, 1951 S. GLOBASH ET AL 2,554,102
AUTOMATIC AND MANUALLY OPERATED LATHE
Filed Nov. 26, 1948 2 Sheets-Sheet 1
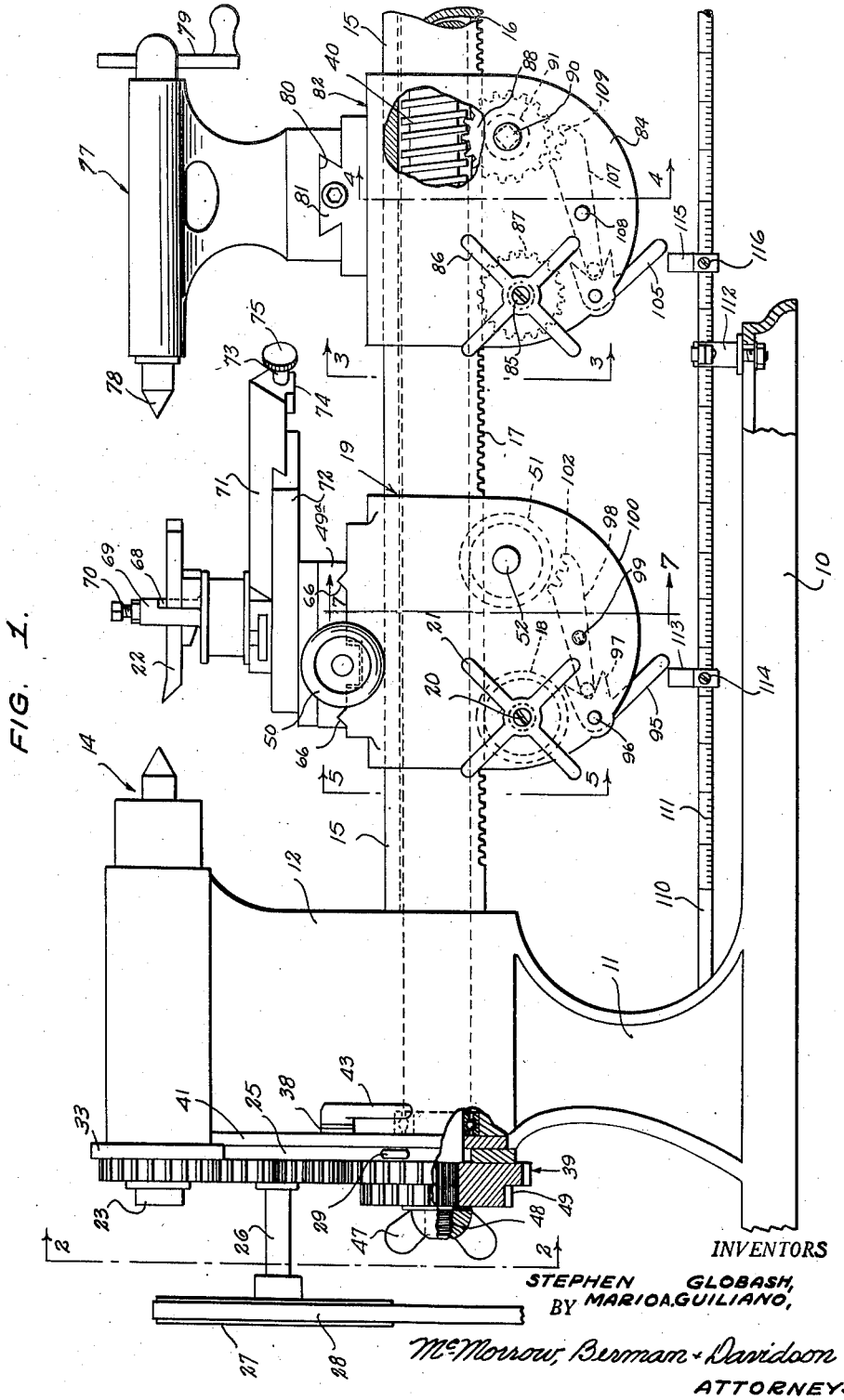
INVENTORS
STEPHEN GLOBASH,
BY MARIO A. GUILIANO,
McMorrow, Berman & Davidson
ATTORNEYS.

May 22, 1951 S. GLOBASH ET AL 2,554,102
AUTOMATIC AND MANUALLY OPERATED LATHE
Filed Nov. 26, 1948 2 Sheets-Sheet 2
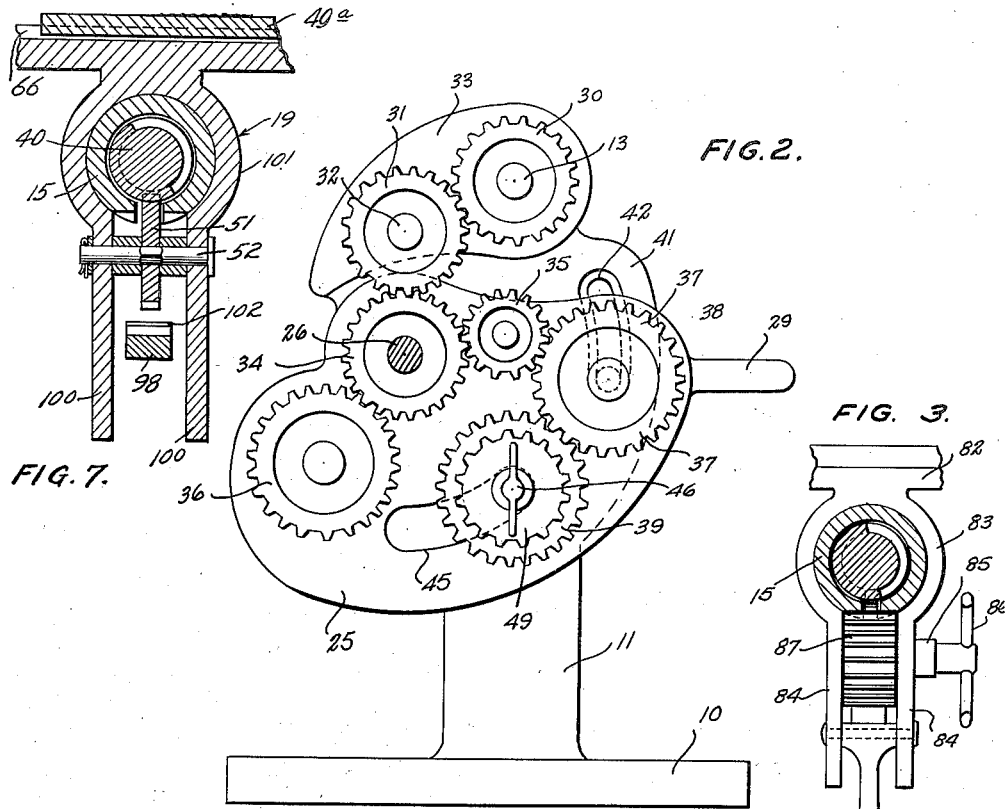
INVENTORS
STEPHEN GLOBASH,
MARIO A. GUILIANO,
BY
McMorrow, Berman + Davidson
ATTORNEYS.

Patented May 22, 1951

2,554,102

UNITED STATES PATENT OFFICE 2,554,102

AUTOMATIC AND MANUALLY OPERATED LATHE

Stephen Globash and Mario A. Guiliano, New York, N. Y.

Application November 26, 1948, Serial No. 61,952

4 Claims. (Cl. 82—21)

This invention relates to a lathe which may be controlled manually or automatically.

An object of the invention is the provision of a lathe having a tail stock which may be moved manually or automatically towards the head stock while the tail stock is shifted laterally, either manually or automatically for performing special operations on a piece of work, provision being made to retain the tail stock stationary when desired. The tool rest also being shiftable automatically or manually across a longitudinal path for the rest.

A further object of the invention is the provision of a lathe in which is incorporated a plurality of trains of gears for automatically driving the chuck in opposite directions, for moving a tool rest and the tail stock in a longitudinal path in opposite directions and for shifting the tool rest and tail stock transversely of the longitudinal path in opposite directions, provision also being made for preventing transverse shifting of the tail stock and tool rest, means mounted for adjustment on a calibrated rod for engagement with instrumentalities on the tail stock and tool rest for stopping the stock and rest after they have performed their functions.

The invention is best understood from a consideration of the following detailed description in connection with the accompanying drawings, nevertheless, it is to be borne in mind that the invention is not confined to the disclosure but is susceptible of such changes and modifications as shall define no material departure from the salient features of the invention as expressed in the appended claims.

In the drawings:

Figure 1 is a side view in elevation of our automatically and manually controlled lathe, Figure 2 is a transverse vertical section taken along the line 2—2 of Figure 1, Figure 3 is a transverse vertical section taken along the line 3—3 of Figure 1, Figure 4 is a fragmentary transverse vertical section taken along the line 4—4 of Figure 1, Figure 5 is a fragmentary transverse vertical section taken along the line 5—5 of Figure 1, Figure 6 is a fragmentary longitudinal vertical section taken along the line 6—6 of Figure 5, and Figure 7 is a fragmentary transverse vertical section taken along the line 7—7 of Figure 1.

Referring more particularly to the drawings, 10 designates a base which is adapted to be secured to a bench. A standard 11 is formed integrally with the base and carries a head stock 12 in which is mounted horizontally a shaft 13. A chuck 14 of the conventional type has connections with the inner end of the shaft.

A horizontal sleeve 15 has one end fixed in the lower portion of the head 12 below the shaft 13 and in parallel relation therewith. This sleeve has a longitudinal slot 16 and teeth 17 along the bottom. A gear 18 on a carriage 19 slidable on the sleeve meshes with the teeth 17. A shaft 20 supported in parallel flanges 100 depending from a bearing 101 on the carriage 19 and operated by a hand wheel 21 revolves the gear to cause reciprocation of the carriage in either direction along the sleeve for positioning the tool 22 relative to the work which is operated on.

A train of gears (Figures 1 and 2) is mounted on a plate 25 rockable on a shaft 26 driven by a pulley 27 and a belt 28 operated in the usual manner by a motor (not shown). The plate is rocked by a handle 29 for a purpose which will be explained presently. Gear 30 is secured to the shaft 13 and meshes with an idler gear 31 on a stub axle 32 secured to a flange 33 projecting laterally from the top of the head stock 12. A driven gear 34 is secured to the shaft 26 and meshes with a pair of idler gears 35 and 36 mounted on stub axle carried by the rockable plate 25. An idler gear 37 mounted on a stub axle 38 meshes with the gear 35. A gear 39 which rotates a worm 40 in the sleeve 15 is adapted to mesh with the gear 37 (Figure 2), or when the plate 25 is rocked will mesh with the gear 36 so that the worm may be driven in opposite directions.

A flange 41 projecting laterally from the head stock 12 has an arcuate slot 42 adapted to receive the inner end of the axle 38. A nut threaded onto said inner end, is operated by a handle 43 for clamping the plate 25 in position when adjusted by the handle 29. Said plate 25 has an arcuate slot 45 receiving the reduced end 46 of the worm 40 so that the plate 25 may be rocked on the shaft 26 as a pivot. A nut 47 is screwed onto the threaded end 48 of the worm for securing the gear 39 on the worm. It will be noted from Figures 1 and 2 that the gear 39 has an integrally formed gear 49 of smaller diameter. Since the gear 39 may be withdrawn by the removal of the nut 47, it may be reversed so that the smaller gear 49 may mesh with the gear 37 or 36 for increasing the speed of rotation of the worm.

The carriage 19 for the tool 22 is moved manually by a hand wheel 50 or automatically. In the automatic operation, a worm gear 51 projecting through the slot 16 in the sleeve 15 meshes with the worm 40 and is rigid with a shaft 52 which is rotatably mounted in the parallel flanges 100 depending from the bearing 101, the latter bearing neatly receiving the sleeve 15, as shown in Figure 7. A plate 54 is oscillated on the shaft 20 by a lever 55 projecting through an arcuate slot 56 in said plate, (Figures 5 and 6). A gear 57 rigid with the shaft 20 is adapted to mesh with a gear 58 and a gear 59 mounted on stub axles secured to the rockable plate 54. The gear 58 meshes with a gear 60 also mounted on a stub axle secured to the rockable plate. A spur gear 61 is mounted on a stub axle fixed to the bracket 53 and gears 59 and 60 are shifted into mesh alternately with the gear 61 when the plate 54 is rocked on the shaft 20 which acts as a pivot. Gear 61 meshes constantly with a gear 62 which revolves a shaft 63 and a worm gear 64 in mesh with a worm or screw 65 mounted for rotation on the carriage 19 and threaded into a bore in the carriage 19 for causing shifting of the carriage 19 transversely of the path of the carriage 19. The hand wheel 50 is secured to one end of the worm 65. The carriage 19 is guided by tracks 66 on the carriage 19 which tracks engage the under surface of the supporting block 49a.

The tool 22 is received by a slot 68 in a tool support 69 and clamped in place by a bolt 70. The support is carried by a slide 71, triangular in cross-section, which is received by a dove-tail groove in a bed block 72 rigid with the supporting block 49a. A screw 73 is threaded into a longitudinal passage in the block and has a bearing 74 in a projection on the outer free end of the slide. A manipulating knob 75 rotates the screw for adjusting the slide and the tool 22. It will be appreciated that various other adjustments may be provided for positioning the tool by well-known conventional means, not described herein for performing the necessary functions on different types of work.

A tail stock 77 includes a work engaging member 78 which is moved longitudinally by the usual manual means 79. The stock has a dove-tail groove 80 receiving a guide member 81 on a carriage 82 so that the stock may be shifted transversely of the path of the movable carriage 82 which has a bearing 83 for the reception of the sleeve 15. Parallel flanges 84 depend from the bearing to provide a support for a shaft 85 operated manually by a wheel 86. A gear 87 is fixed to the shaft and meshes with the teeth 17 of the sleeve 15 for moving the carriage 82 longitudinally of the sleeve. A worm gear 88 meshes with the worm 40 for automatically shifting the stock 77 toward and away from the chuck 14 of the head stock 12, the gear revolving a shaft 90 which is rotatably supported in the parallel flanges 84.

The carriage 19 is provided with a depending lever 95 which has a fork 97 receiving the free end of a lever 98, pivoted at 99 on parallel flanges 100 depending from a bearing 101 receiving neatly the sleeve 15. The lever 95 is pivoted at 96 on said flanges. The other end of the lever 98 has an arcuate rack 102 adapted to engage the teeth of the worm gear 51 for effecting limited movement of the carriage 19 toward and away from the head stock 12, depending upon the direction of rotation of the worm 40.

Similarly the carriage 82 is moved by a depending lever 105 pivoted on the flanges 84 and having a fork 106 engaging one end of a lever 107 pivoted at 108 on the flanges. This lever has an arcuate rack 109 adapted to engage the teeth of the worm gear 88 when said lever is rocked by the fork.

A rod 110 has calibrations 111 and has one end mounted in the standard 11 while the other end is secured by a post 112 fixed to the base 10. A stop 113 is slidable on the rod but is secured in an adjusted position along the calibrations by a set screw 114. A second stop 115 is slidable on the rod 110 and is held in an adjusted position by a set screw 116.

The operation of our device is as follows: The tool rest is moved along the sleeve 15 by the carriage 19 manually when the wheel 21 is revolved and when the plate 54 has been so rocked on shaft 20 that the gears 59 and 60 are out of mesh with the gear 61 (Figure 6). However, the tool rest is moved longitudinally when either the gear 59 or the gear 60 is in mesh with the gear 61 since the gear 57 is revolved for rotating the shaft 20 which revolves the gear 18 meshing with the teeth 17 of the sleeve 15.

The tool rest may be shifted manually and transversely of the longitudinal path by manipulation of the wheel 50 when the plate 54 has been rocked to a neutral position. When the plate is rocked in either direction one of the gears 59 or 60 will mesh with the gear 61 to cause rotation of the shaft 20 so that the worm gear 63 and the worm 65 will cause lateral shifting of the tool rest automatically in either direction desired.

Holes may be bored by the lathe. In this case, the tail stock 77 is moved automatically by the operation of the train of gears which are actuated by the worm 40 and the worm gear 88 when the lever 107 is rocked about its pivot 108 in the proper direction.

The lathe is capable of cutting key slots of any desired length in a shaft. The length of the slot is determined by the positions of the stop 113 on the rod 110. The lathe will perform many kinds of work more rapidly because of the various automatic operations.

During the automatic operation of the tool rest by rocking the plate 54 in the proper direction, the stop is so positioned along the rod 110 so that lever 95 will engage said stop to causing shifting of the lever 98 by the fork 97 of the lever 95 when the teeth 102 will engage the gear 51 and advance the carriage 19 in its longitudinal movement along the sleeve 15. The carriage 82 of the tail stock will be moved when the teeth on the lever 107 is caused to engage the worm gear 88 when the lever 105 contacts the member 115, the movement being limited and being toward or away from the head stock 12 depending upon the direction of the rotation of the worm 40.

The worm gear 51 engaging the side edges of the slot 16 will cooperate with the gear 18 and the teeth 17 on the sleeve 15 to prevent rocking of the tool rest. Likewise, the worm gear 88, the spur gear 87, slot 16 and teeth 17 perform a similar function for the tail stock 77.

What is claimed is:

1. In a lathe, a base, a standard arranged adjacent one end of said base and secured thereto, a head stock including a rotatable chuck carried by said standard, a horizontally disposed sleeve arranged below and spaced from said chuck and having one end fixedly supported in said head stock, said sleeve being provided with a longitudinal slot having a plurality of teeth along its bounding walls, a longitudinally disposed worm within said sleeve and rotatably supported in and having one end projecting beyond said head stock, a gear on the projecting end of said worm, change speed gearing adapted to connect said chuck with said gear, a carriage slidably supported on said sleeve, a tool support positioned on top of said carriage and mounted for movement transversely of said sleeve, a shaft positioned transversely of and rotatably supported in said carriage, a second gear carried by said shaft and in meshing engagement with the teeth on said sleeve, a second transverse shaft positioned in parallel spaced relation with respect to said first named shaft and rotatably supported in said carriage, a worm gear carried by said second shaft and in meshing engagement with the worm in said sleeve, a lever positioned below and spaced from said second gear and pivotally supported intermediate its ends on said carriage, one end of said lever depending from said carriage, the other end of said lever being provided with a fork, a second lever positioned within and pivotally supported in said carriage and having one end in engagement with the fork of said first named lever, the other end of said second lever being provided with an arcuate rack engageable with said worm gear, a longitudinally disposed rod arranged below and parallel to said sleeve and fixedly supported on said standard and base, and a stop fixedly supported on said rod and engageable with the depending end of said lever to thereby shift the rack of said second lever into engagement with said worm gear and cause limited longitudinal movement of said carriage.

2. In a lathe, a base, a standard arranged adjacent one end of said base and secured thereto, a head stock including a rotatable chuck carried by said standard, a horizontally disposed sleeve arranged below and spaced from said chuck and having one end fixedly supported in said head stock, said sleeve being provided with a longitudinal slot having a plurality of teeth along its bounding walls, a longitudinally disposed worm within said sleeve and rotatably supported in and having one end projecting beyond said head stock, a gear on the projecting end of said worm, change speed gearing adapted to connect said chuck with said gear, a carriage slidably supported on said sleeve, a tool support positioned on top of said carriage and mounted for movement transversely of said sleeve, a shaft positioned transversely of and rotatably supported in said carriage, a second gear carried by said shaft and in meshing engagement with the teeth on said sleeve, a second transverse shaft positioned in parallel spaced relation with respect to said first named shaft and rotatably supported in said carriage, a worm gear carried by said second shaft and in meshing engagement with the worm in said sleeve, a lever positioned below and spaced from said second gear and pivotally supported intermediate its ends on said carriage, one end of said lever depending from said carriage, the other end of said lever being provided with a fork, a second lever positioned within and pivotally supported in said carriage and having one end in engagement with the fork of said first named lever, the other end of said second lever being provided with an arcuate rack engageable with said worm gear, a longitudinally disposed rod arranged below and parallel to said sleeve and fixedly supported on said standard and base, a stop fixedly supported on said rod and engageable with the depending end of said lever to thereby shift the rack of said second lever into engagement with said worm gear to cause limited longitudinal movement of said carriage, and means for effecting the transverse movement of said tool support, said means comprising a third gear spaced from said second gear and carried by said first named shaft, a worm screw positioned transversely of and in threaded engagement with the bore formed in said carriage, a third shaft arranged transversely of and rotatably supported in said carriage, a second worm gear carried by said third shaft and in meshing engagement with said worm screw, a fourth gear spaced from said second worm gear and carried by said third shaft, and gearing adapted to connect said third gear to said fourth gear.

3. In a lathe, a base, a standard arranged adjacent one end of said base and secured thereto, a head stock including a rotatable chuck carried by said standard, a horizontally disposed sleeve arranged below and spaced from said chuck and having one end fixedly supported in said head stock, said sleeve being provided with a longitudinal slot having a plurality of teeth along its bounding walls, a longitudinally disposed worm within said sleeve and rotatably supported in and having one end projecting beyond said head stock, a gear on the projecting end of said worm, change speed gearing adapted to connect said chuck with said gear, a carriage slidably supported on said sleeve, a tool support positioned on top of said carriage and mounted for movement transversely of said sleeve, a shaft positioned transversely of and rotatably supported in said carriage, a second gear carried by said shaft and in meshing engagement with the teeth on said sleeve, a second transverse shaft positioned in parallel spaced relation with respect to said first named shaft and rotatably supported in said carriage, a worm gear carried by said second shaft and in meshing engagement with the worm in said sleeve, a lever positioned below and spaced from said second gear and pivotally supported intermediate its ends on said carriage, one end of said lever depending from said carriage, the other end of said lever being provided with a fork, a second lever positioned within and pivotally supported in said carriage and having one end in engagement with the fork of said first named lever, the other end of said second lever being provided with an arcuate rack engageable with said worm gear, a second carriage carrying a tail stock spaced from said first carriage and slidably supported on said sleeve, a third shaft positioned transversely of and rotatably supported in said second carriage, a third gear carried by said third shaft and in meshing engagement with the teeth on said sleeve, a fourth transverse shaft positioned in parallel spaced relation with respect to said third shaft and rotatably supported in said second carriage, a second worm gear carried by said fourth shaft and in meshing engagement with the worm in said sleeve, a third lever positioned below and spaced from said third gear and pivotally supported intermediate its ends on said second carriage, one end of said third lever depending from said second carriage, the other end of said third lever being provided with a fork, a fourth lever positioned within and pivotally supported in said second carriage and having one end in engagement with the fork of said third lever, the other end of said fourth lever being provided with an arcuate rack engageable with said second worm gear, a longitudinally disposed rod arranged below and parallel to said sleeve and fixedly supported on said standard and base, and a pair of spaced stops fixedly supported on said rod and each engageable with the adjacent depending end of said first and third levers to thereby shift the racks of said second and fourth levers into engagement with said first and second worm gears respectively and cause limited longitudinal movement of said first and second carriages.

4. In a lathe, a base, a standard arranged adjacent one end of said base and secured thereto, a head stock carried by said standard, a horizontally disposed shaft rotatably supported in said head stock and having one end projecting from the latter, a gear on the projecting end of said shaft, a chuck projecting from the other end of said shaft, a horizontally disposed sleeve arranged below and spaced from said shaft and having one end fixedly supported in said head stock, said sleeve being provided with a longitudinal slot having a plurality of teeth along its bounding walls, a longitudinally disposed worm within said sleeve and rotatably supported in and having one end projecting beyond said head stock, a second gear on the projecting end of said worm, a vertically disposed plate positioned outwardly of said head stock and mounted for rocking movement on the projecting end of said worm, a driven gear mounted on the outer face of said plate and adapted to be connected to a drive shaft, a flange exteriorly of said head stock, a first idler gear carried by the outer face of said flange and in meshing engagement with the gear on the projecting end of said shaft and said driven gear, a train of gears including a pair of idler gears on the outer face of said plate and operatively connected to said driven gear, one of said pair of idler gears being in meshing engagement with said second gear upon execution of the rocking movement of said plate in one direction and the other of said pair of idler gears being in meshing engagement with said second gear upon execution of the rocking movement of said plate in the opposite direction, a carriage slidably supported on said sleeve, a tool supported on said carriage, a third gear rotatably supported in said carriage and in meshing engagement with the teeth on said sleeve, a worm gear positioned in parallel spaced relation with respect to said third gear and in meshing engagement with the longitudinal worm in said sleeve, a lever positioned below and spaced from said third gear and pivotally supported intermediate its ends on said carriage, one end of said lever depending from said carriage, the other end of said lever being provided with a fork, a second lever positioned within and pivotally supported in said carriage and having one end in engagement with the fork of said first named lever, the other end of said second lever being provided with an arcuate rack engageable with said worm gear, a longitudinally disposed rod arranged below and parallel to said sleeve and fixedly supported on said standard and base, and a stop fixedly supported on said rod and engageable with the depending end of said lever to thereby shift the rack of said second lever into engagement with said worm gear and cause limited longitudinal movement of said carriage.

STEPHEN GLOBASH.
MARIO A. GUILIANO.

REFERENCES CITED

The following references are of record in the file of this patent:

UNITED STATES PATENTS

| Number | Name | Date |
|---|---|---|
| 854,532 | Runge | May 21, 1907 |
| 1,027,496 | Mills | May 28, 1912 |
| 1,417,521 | Haumann | May 30, 1922 |
| 1,592,914 | Verschoyle | July 20, 1926 |
| 2,151,873 | Senger | Mar. 28, 1939 |
| 2,416,612 | Cavanagh | Feb. 25, 1947 |

FOREIGN PATENTS

| Number | Country | Date |
|---|---|---|
| 77,410 | Switzerland | Sept. 2, 1918 |